(12) United States Patent
Bellotti et al.

(10) Patent No.: US 10,453,495 B2
(45) Date of Patent: Oct. 22, 2019

(54) SYSTEM AND METHOD FOR INTUITIVE AND SOCIALLY ALIGNED ACCESS CONTROL

(71) Applicant: Palo Alto Research Center Incorporated, Palo Alto, CA (US)

(72) Inventors: Victoria M. E. Bellotti, San Francisco, CA (US); Shane P. Ahern, Belmont, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 15/453,751

(22) Filed: Mar. 8, 2017

(65) Prior Publication Data

US 2018/0261247 A1 Sep. 13, 2018

(51) Int. Cl.
| | | |
|---|---|---|
| *G11B 27/031* | (2006.01) | |
| *G11B 27/10* | (2006.01) | |
| *G06F 21/00* | (2013.01) | |
| *H04N 5/76* | (2006.01) | |
| *H04N 9/82* | (2006.01) | |
| *G06F 21/34* | (2013.01) | |
| *G06F 21/62* | (2013.01) | |
| *H04M 1/725* | (2006.01) | |

(52) U.S. Cl.
CPC ............ *G11B 27/031* (2013.01); *G06F 21/00* (2013.01); *G06F 21/34* (2013.01); *G06F 21/62* (2013.01); *G11B 27/10* (2013.01); *H04N 5/76* (2013.01); *H04N 9/8205* (2013.01); *H04M 1/72572* (2013.01); *H04M 1/72577* (2013.01)

(58) Field of Classification Search
CPC ................ H04N 9/79; H04M 1/72577; H04M 1/72572; G11B 20/00181; G11B 20/00739; G11B 20/00144; G11B 27/031; G11B 27/10; G11B 20/10527; G11B 2020/10537
USPC .................................................. 386/200, 230
See application file for complete search history.

(56) References Cited

U.S. PATENT DOCUMENTS

2007/0211876 A1* 9/2007 Othmer ................. H04M 1/656
 379/201.01
2007/0250622 A1* 10/2007 Granito ................... H04L 51/04
 709/224

(Continued)

FOREIGN PATENT DOCUMENTS

CN 105718874 A * 6/2016

*Primary Examiner* — Loi H Tran
(74) *Attorney, Agent, or Firm* — Shun Yao; Park, Vaughan, Fleming & Dowler LLP

(57) ABSTRACT

One embodiment provides a system that facilitates access control. During operation, the system generates, by a first mobile computing device associated with a first user, a request to record information of a second user associated with a second mobile computing device. In response to receiving, from the second mobile computing device, an acceptance of the request, the system records, by the first mobile computing device, the information of the second user based on recording-related preferences of the second user. In response to receiving, from the second mobile computing device, a rejection of the request, the system precludes the first mobile computing device from recording the information of the second user, thereby facilitating intuitive and socially aligned access control.

20 Claims, 11 Drawing Sheets

(56) References Cited

U.S. PATENT DOCUMENTS

| | | | |
|---|---|---|---|
| 2010/0086277 A1* | 4/2010 | Craner | H04N 5/76 386/278 |
| 2015/0186536 A1* | 7/2015 | Bosworth | G06F 17/30867 707/754 |
| 2015/0324005 A1* | 11/2015 | Kobayashi | H04N 9/3179 345/173 |
| 2016/0044625 A1* | 2/2016 | Anesi | H04W 64/00 455/411 |
| 2016/0057713 A1* | 2/2016 | Zhang | H04W 52/386 455/418 |
| 2016/0313963 A1* | 10/2016 | Kang | G06F 3/011 |
| 2016/0358013 A1* | 12/2016 | Carter | H04W 4/023 |
| 2018/0032798 A1* | 2/2018 | Setchell | G06K 9/00255 |
| 2018/0114219 A1* | 4/2018 | Setchell | G06Q 20/3829 |

\* cited by examiner

SYSTEM AND METHOD FOR INTUITIVE AND SOCIALLY ALIGNED ACCESS CONTROL

BACKGROUND

Field

This disclosure is generally related to data collection. More specifically, this disclosure is related to a system and method for facilitating intuitive and socially aligned access control during data collection in various settings.

Related Art

Personal recording devices are worn and used to record and collect data at a rapid pace. Currently, in public settings, data collection is a "free-for-all," and can include mobile phones, dashboard cameras inside vehicles, spy cameras, drones, and wearable devices such as Google Glass. In private settings, data collection is currently managed on a case-by-case basis, with no consistent standard regarding, e.g., the type of setting, the location, and the user(s) involved. A user who wishes to record is not provided with a clear set of guidelines regarding how, when, and what is an appropriate situation for recording. At the same time, a user who may be potentially recorded is not provided with a clear set of guidelines regarding how, when, and what is an appropriate situation in which to expect being recorded. Notice or communication between such persons, even in private settings, may be haphazard, inconsistent, or even non-existent.

SUMMARY

One embodiment provides a system that facilitates access control. During operation, the system generates, by a first mobile computing device associated with a first user, a request to record information of a second user associated with a second mobile computing device. In response to receiving, from the second mobile computing device, an acceptance of the request, the system records, by the first mobile computing device, the information of the second user based on recording-related preferences of the second user. In response to receiving, from the second mobile computing device, a rejection of the request, the system precludes the first mobile computing device from recording the information of the second user, thereby facilitating intuitive and socially aligned access control.

In some embodiments, in response to recording the information of the second user, the system determines metadata associated with the second user based on one or more of: the information of the second user; the recording-related preferences of the second user; information of one or more users in a same physical space as the second user; and recording-related preferences of one or more users associated with the second user.

In some embodiments, subsequent to a commencement of the recording of the information of the second user, the system receives a first command or a second command. In response to receiving, from the second mobile computing device, a first command to delete the recording, wherein the first command is received within a predetermined amount of time after recording is commenced, the system terminates the recording, and deletes the recording from any device on which the recording is stored. In response to receiving, from the second mobile computing device, a second command to delete an indicated number of most recent minutes of the recording, the system deletes the indicated number of most recent minutes of the recording.

In some embodiments, in response to recording the information of the second user, and in response to detecting a third user entering a physical space of the recording, wherein the third user is associated with a third mobile computing device, and wherein the physical space includes the first mobile computing device and the second user, the system generates, by the first mobile computing device, a notification indicating that the third user is entering the physical space of the recording, which allows the third user to: leave the physical space; or remain in the physical space, which allows the third mobile computing device to transmit, to the first mobile computing device, an acceptance of the notification, wherein the acceptance indicates recording-related preferences of the third user and allows the first mobile computing device to record the third user based on the recording-related preferences of the third user.

In some embodiments, the information of the second user includes one or more of: audio data; video data; an image; and metadata, including one or more of a name, an age, a current location, an occupation, a social media profile, a relationship to the first user and to one or more other detected users, recording-related preferences, and any other information associated with the second user which can be captured and recorded by a mobile computing device. The recording-related preferences of the second user include one or more of: audio-related preferences, including distorting the second user's speech and masking the second user's voice; video-related preferences, including pixelating an image of the second user's face or body; and metadata-related preferences, including whether to record the second user's identity, other information about the second user, and the second user's relation to one or more other detected users. In some embodiments, in response to receiving the rejection of the request, the system analyzes recorded video or audio information, and applies the rejection. Receiving the rejection of the request further comprises one or more of: pixelating an image of the second user's face or body; and distorting an audio signal of the second user's voice. In response to unsuccessfully identifying, based on a voiceprint of the second user, the second user from a group of other detected users, the system: determines, based on a speed of sound, a time difference between the audio signal of the second user's voice arriving at a microphone of the first mobile computing device and a microphone of the second mobile computing device; and identifies, based on the time difference, the second user from the group of other detected users. In many situations, a mobile computing device is likely to be closest in position to the voice of its owner (or associated user), in which case that mobile computing device will receive the voice audio signal first (e.g., before any other mobile computing device). This can help to disambiguate between speakers (i.e., identify a specific user from a group of users).

In some embodiments, in response to determining an emergency, the system initiates, by the first mobile computing device, an emergency mode which overrides the acceptance or the rejection of the request. The system records any audio data, video data, images, and metadata capable of being recorded by the first mobile computing device. The system uploads the recording to a secure device which may only be accessed by an emergency service.

In some embodiments, the system determines a profile for the first user based on the first user's recording-related preferences. The system associates, with the profile for the first user, information including a faceprint, a voiceprint, and metadata of one or more other users, wherein any recording or recording the information of the second user is further based on the associated information of the one or more other users.

In some embodiments, the system determines a profile for the second user based on the second user's recording-related preferences, wherein the profile for the second user includes a registered faceprint and a registered voiceprint of the second user. The system detects, by the first mobile computing device, the second user's faceprint and voiceprint. The system associates the second user's faceprint and voiceprint with the second user's recording-related preferences In some embodiments, the system can perform one or more other operations or methods. The system provides the second user access to a central service with which to register the second user's profile and recording-related preferences. The system broadcasts the second user's recording-related preferences to other users of the central service, wherein the other users are within a predetermined distance of or in a same physical space as the second user. In response to detecting a violation of the second user's recording-related preferences, the system sends a notification to the second user indicating the detected violation of the second user's recording-related preferences. In response to detecting a violation by the first user of the recording-related preferences of the second user or recording-related preferences of any user, the system sends a notification to the first user indicating the detected violation by the first user. The system provides a subscription to a data source for the second user. The system records the second user based on a predetermined limit for a type of recording and a GPS-based inference of a distance from the first user's physical location to the second user's physical location, wherein the type of recording includes one or more of audio, video, image, and metadata.

In some embodiments, the system (by, e.g., a user) defines a recording-free zone which precludes a mobile computing device physically located in or within a predetermined distance from the recording-free zone from recording (any data) or from recording any information of any user physically located in the recording-free zone. The system (by, e.g., a user) defines a partial recording-free zone which precludes a mobile computing device physically located in or within a predetermined distance from the partial recording-free zone from recording (any data) or from recording some type or types of information of any user physically located in the partial recording-free zone, based on a predetermined set of rules or recording-related preferences of a respective user physically located in the partial recording-free zone. For example, a user can define a geographic area associated with certain GPS coordinates as a recording-free or restricted recording zone, whether or not there are people within the area. This means that no audio or video or metadata whatsoever may be recorded within that area (recording-free zone), or that recording may only be allowed at certain time or by certain entities (restricted recording zone). Such a geographic area may or may not be restricted to a user's private property, or an area over which that user has demonstrable authority. The user may specify a variety of preferences, depending on the possible variations in agreed system usage, refinements, or variations in the system settings, Another embodiment provides a system that facilitates access control. During operation, the system receives, by a first mobile computing device associated with a first user, from a second mobile computing device associated with a second user, a request to record information of the first user. The request can be triggered by an action of the second user via the second mobile computing device, or automatically by an entry of the second mobile computing device into a specific zone. For example, the specific zone may be defined by a predetermined distance from the first mobile computing device or may be defined by specific GPS coordinates which may be determined based on the first user's recording-related preferences. In response to determining an acceptance of the request, the system transmits the acceptance of the request to the second mobile computing device, wherein the acceptance indicates recording-related preferences of the first user and allows the second mobile computing device to record the information of the first user based on the recording-related preferences of the first user. In response to determining a rejection of the request, the system transmits the rejection of the request to the second mobile computing device, which rejection precludes the second mobile computing device from recording the information of the first user, thereby facilitating intuitive and socially aligned access control.

In some embodiments, subsequent to transmitting the acceptance of the request and allowing the second mobile computing device to record the information of the first user, the system generates a first command or a second command. The system generates, by the first mobile computing device, a first command to delete the recording, wherein the first command is transmitted to the second mobile computing device within a predetermined amount of time after recording is commenced, which allows the second mobile computing device to terminate the recording, and delete the recording from any device on which the recording is stored. Alternatively, the system generates, by the first mobile computing device, a second command to delete an indicated number of most recent minutes of the recording, wherein the second command is transmitted to the second mobile computing device, which allows the second mobile computing device to delete the indicated number of most recent minutes of the recording.

In some embodiments, the system determines, by the first user or the first mobile computing device, an emergency. The system transmits, by the first mobile computing device to the second mobile computing device, a third command indicating the emergency, which allows the second mobile computing device to: initiate an emergency mode which overrides the acceptance or the rejection of the request; record any audio data, video data, images, and metadata capable of being recorded by the first mobile computing device; and upload the recording to a secure device which may only be accessed by an emergency service.

In some embodiments, the system determines a profile for the first user based on the first user's recording-related preferences. The system registers, in the profile for the first user, a faceprint and a voiceprint of the first user, which allows the second mobile computing device to detect and associate the first user's faceprint and voiceprint with the first user's recording-related preferences.

BRIEF DESCRIPTION OF THE FIGURES

In the figures, like reference numerals refer to the same figure elements.

DETAILED DESCRIPTION

Figure 1A:
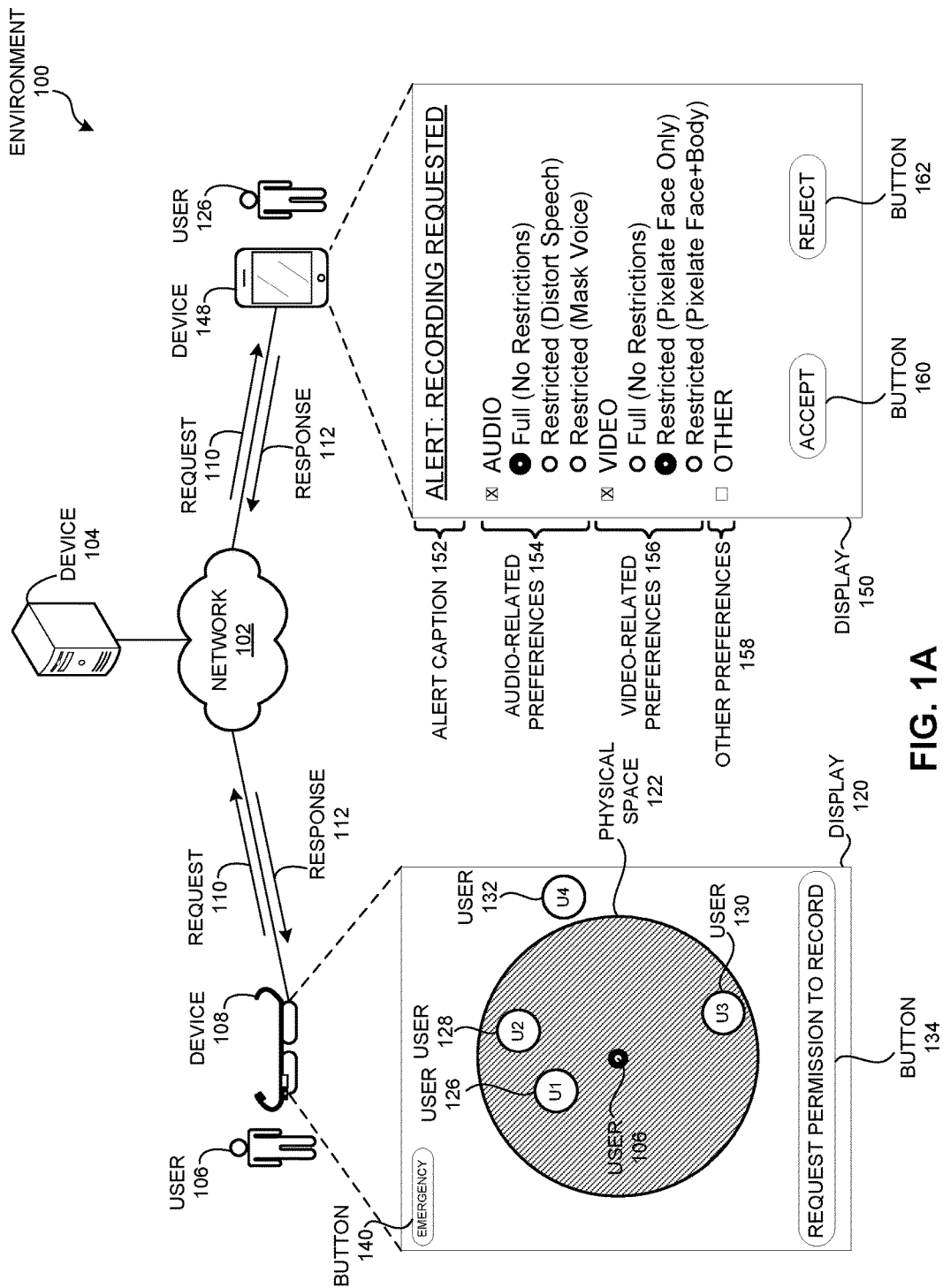
FIG. 1A illustrates an exemplary environment which facilitates access control, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which provides consistent access control under a specific set of guidelines to both a person who wishes to record ("recorder") and a person who may be potentially recorded ("recordee"). Currently, in public settings, data collection is a "free-for-all," and can include mobile phones, dashboard cameras inside vehicles, spy cameras, drones, and wearable devices such as Google Glass. In private settings, data collection is currently managed on a case-by-case basis, with no consistent standard regarding, e.g., the type of setting, the location, and the user(s) involved. A recorder is not provided with a clear set of guidelines regarding how, when, and what is an appropriate situation for recording. At the same time, a recordee is not provided with a clear set of guidelines regarding how, when, and what is an appropriate situation in which to expect being recorded. Notice or communication between the recorder and the recordee, even in private settings, may be haphazard, inconsistent, or even non-existent.

Embodiments of the present invention solve these problems by providing a system based on principles of social etiquette informed by social science. Users (whether prospective recorders or recordees) may join a service provided by the system. Upon joining, a User A can set his recording-related preferences, such as a default of "Audio only." The service can broadcast to other users that User A has joined and is a participant in the service. Over time, after many users have joined the service, a Person B (who is not a participating member or user of the service) who is using recording devices may become more noticeable to other users as a person who may be indiscriminately recording others without providing guidance as to how they plan to use the recorded information. That is, Person B may be viewed by participating system users as an "untrusted" recorder who, because Person B has not joined the service, is both unaware of, and therefore not capable of respecting or adhering to, the recording-related preferences of other users. Furthermore, Person B's recording-related preferences are not known to other participating system users.

All users participating in the system may be notified of recording requests or ongoing recordings via multiple channels, including audio, visual, and online alert cues. A user may enter a user profile which includes the user's recording-related preferences. The recording-related preferences may be used to determine how, when, and where a subsequent recording is to occur. For example, the recording-related preferences may include various default settings, such as a "Full" or "Unrestricted" audio-related access preference and a "Restricted (Pixelate Face and Body)" video-related access preference. An exemplary user profile is described below in relation to FIG. 2.

To align with expectations in a social setting, a user who wishes to commence recording (a "recorder") must send an initial notification or request to all users within a certain physical range (e.g., twelve feet) of the recorder ("recordees" or "in-range users"). The system may be configured to allow the recorder to begin recording only when an acceptance of the request is received from each in-range user, or when a certain predetermined wait time has elapsed (e.g., thirty seconds). The recorder can configure settings for the requested recording differently based on the relational status of other users (e.g., the recorder, in-range users, other users, or any one). The recorder can also initiate an emergency mode which allows recording to begin immediately, regardless of any acceptance or rejection responses to the initial request. This emergency mode recording may be uploaded to a secure site which may only be accessed by an emergency service, such as a private security company, the police, or a state or federal agency.

Any in-range user may block a requested recording or prevent the requested recording from occurring by sending a rejection of the request, before the predetermined wait time has elapsed. A lack of response from an in-range user after the time has elapsed may be treated by the system as an implicit acceptance or an implicit rejection of the request. An in-range user can also terminate a recording which has already commenced within a short period of time (e.g., five seconds) after the recording has commenced. Furthermore, an in-range user can perform these actions anonymously to avoid the risk of intimidation.

A user that enters into the physical range of an ongoing recording ("entering user") can be sent a notification, to which the entering user may respond by either anonymously leaving the physical range or by responding with the entering user's individual restrictions (as per the exemplary user profile described below in relation to FIG. 2).

A user can configure his recording-related preferences in his user profile, or change the preferences dynamically before a requested recording, or change the preferences dynamically during an ongoing recording. For example, the user's configured default settings may include a "what you get is what I get" (WYGIWIG) setting, which allows unrestricted audio, video, and metadata access. However, upon receiving a request to record, an in-range user can change the video setting to "Restricted (Pixelate Face and Body)."

In addition to capturing raw data in a recording (e.g., images, video data, and audio data), the system can also determine or infer metadata based on the raw data ("inferencing"). The inferred metadata can include face recognition, who is talking, what is being said, etc. During the recording, the system can broadcast to all in-range users a notification of the metadata being inferred and gathered.

Thus, embodiments of the present invention provide a system which improves access control in recordings or data collection, where the improvements are fundamentally technological. The system provides a technological solution (e.g., using a service which provides a set of guidelines for when, where, and how a user may record another user(s)) to the technological problem of the efficient and consistent access control in data collection (e.g., recording data) in various settings.

Exemplary System Settings

As described above, the system can rely on certain principles for recording in private settings, including requiring an acceptance of a recording request from all in-range users as a condition for recording. The system may also be configured with specific defaults which may align with a user's expectations, but which may differ from the principles previously described. For example, the system may not enable recording in a private setting until the system detects social interaction, including whether and which recognized users who have previously specified recording-related preferences within the system are interacting and how those users are interacting (e.g., via face-to-face interaction, repeated eye contact, and utterance or body movement synchronization). Upon commencing of recording, another system default may be the WYGIWIG setting, so that all interacting users who are recognized by the system may have equal access to the recording. Regardless of whether the system requires an explicit acceptance from all in-range users in order to begin recording (as described above), the system can notify all parties of the recording and any possible inferencing (i.e., any metadata determined or inferred from the raw data of the recording).

The system may also remember past settings between known users. If a certain access level of recording and inferencing was permitted in the most recent interaction between a recorder and a recordee, then that same access level is automatically agreed upon for the next interaction between that recorder and that recordee. This setting may automatically allow the most recently-used setting to continue until changed by the user, or to end after a certain number of interaction or a certain period of time (as determined by the system or configured by the user).

In some embodiments, the system allows individuals, families, or companies to define rules within their respective space, such as a personal space for an individual, the location of the home for a family, and the location of the business for the company. These rules may differ depending on, e.g., location (where a user is at a certain time), time (when the user is at a certain place), and company (whom the user is with at a certain time or location). For example, the rules may differ depending on whether a user is in a private home setting with friends, a private non-home setting with strangers, or a work setting with colleagues.

In a work setting, an employer may have the right to know where an employee is and who an employee is with while the employee is on the employer's premises, using the data collected by the employee while the employee is on the employer's premises. However, the employee may have a right to know what the employer is able to see and what the employer may possible infer using the employee's collected data. The employer can also define recording-free zones (such as a bathroom or locker room area) within the employer's premises, where recording and inferencing is strictly banned (and automatically enforced) in these recording-free zones.

As another example, an owner of a home (or a person with authority to set system rules in a home) may define a partial recording-free zone (such as a kitchen or a dining room) within the home, where inferencing is strictly banned and only recording of, e.g., audio data is allowed. Furthermore, the recording threshold may be different depending on the type of data (e.g., GPS, audio, video, image, and metadata), and may be set by the system or configured by the user.

Broker Agent Service

The system can also include a broker agent service ("agent") which broadcasts preferences and policies of users, and also provides notifications and enforcement of rules and recording-related preferences. The agent can provide a system user with a central location at which to register the user's recording-related preferences and any rules or policies relevant to the user. The agent can also allow new participants or users to join the service. The agent can broadcast the user's recording-related preferences and policies to nearby users of the service, where the nearby users are currently within a predetermined distance of or in a same physical space as the user. These broadcasts may be in a format of a publically shared description standard, such that other services may design methods to automatically process the broadcasts and enable appropriate responses, e.g., terminate the recording, or pixelate images of faces.

Given a first user whose preferences are being violated by a second user, the agent can send a notification to the first user (whose preferences and policies are being violated), and can further send a notification to the second user (who is violating the first user's preferences and policies). The agent can also enable a subscription service, such that a user may subscribe to a data source, e.g., to follow another user who is broadcasting from an event or a location of interest, or to follow someone who enjoys logging or streaming their life over a public platform.

Exemplary Network and Communication

FIG. 1A illustrates an exemplary environment 100 which facilitates access control, in accordance with an embodiment of the present invention. Environment 100 can include a computer network 102. Environment 100 can also include a user 106 associated with a computing device 108 and a user 126 associated with a computing device 148. Devices 108 and 148 can be a mobile computing device, a smartphone, a laptop, a tablet, a computer, an optical head-mounted or wearable voice-controlled display device (such as Google Glass), a drone, or any other computing device. Environment 100 can also include a device 104, which can be a server, a content-hosting device, a central service with user information and recording-related preferences, or any other computing device. Device 104 can host a central service, and can further store or maintain access to system rules, policies, user profiles, user information, recording-related preferences, audio data, video data, images, and metadata.

Device 108 can include a display 120, which can indicate a physical space 122, which may include the following: a user 106 (corresponding to user 106 and indicated with the same label for clarification); a user 126 ("U1"); a user 128 ("U2"); and a user 130 ("U3"). Display 120 can also include a user 132 ("U4") that is not inside physical space 122. Display 120 can also include a "Request Permission to Record" button 134.

User 106 may be presented with display 120, where the locations of U1, U2, U3, and U4 are based on faceprint video-based or voiceprint audio-based location tracking, or GPS, or Wi-Fi, or Bluetooth, infrared sensor, or other indoor or outdoor absolute or relative position system inferences about detected faces, voice, or mobile computing devices associated with each of U1, U2, U3, and U4. Associating a user's faceprint and voiceprint with a profile and recording-related preferences is described below in relation to FIGS. 3D and 3E. User 106 can click on button 134, and device 108 can generate and transmit a request 110 to device 148 corresponding to user 126 (i.e., U1) via network 102. U1 is an in-range user, as are U2 and U3. Note that device 104 may receive request 110 and determine to send request 110 to device 148. Device 104 may further determine to send request 110 to other mobile computing devices, such as the mobile computing devices associated with U2 and U3.

User 126 can receive request 110 via device 148, which can include a display 150 with an alert caption 152 and recording-related preferences, including: audio-related preferences 154, with options; video-related preferences 156, with options; and other preferences 158, options not shown. Display 150 can also include an "Accept" button 160 and a "Reject" button 162. Display 150 can display default settings of user 126, such as "Full" audio access and "Restricted (Pixelate Face Only)" video access.

User 126 can click on either button 160 or button 162. If user 126 clicks on accept button 160, device 148 generates and transmits a response 112 to device 108 via network 102. Response 112 can indicate an acceptance of the request, and can include recording-related preferences 154-158 of user 126. Device 108 can subsequently begin recording based on the recording-related preferences of user 126 as received in response 112. Device 104 may also receive response 112 and collect information related to user 126 or as included or changed in response 112.

If user 126 instead clicks on reject button 160, device 148 generates and transmits a response 112 to device 108 via network 102. Response 112 can indicate a rejection of the request. Upon receiving response 112, device 108 is precluded from recording user 126 (and physical space 122 which includes user 126).

Display 120 can also include an "Emergency" button 140, which user 106 can select if user 106 determines or detects an emergency, such as witnessing a criminal activity that is capable of being recorded by device 108. This "emergency" mode overrides any acceptance or rejection of a pending request to record, and allows device 108 to immediately begin recording. The emergency mode recording is uploaded to a secure device which may only be accessed by an emergency service. Device 108 may also detect or determine the emergency, e.g., based on sensors and inferred metadata such as shots fired.

Thus, environment 100 demonstrates properties of the system where any in-range user can block a requested recording (i.e., where a recorder must obtain permission from all in-range users in order to begin recording).

Figure 1B:
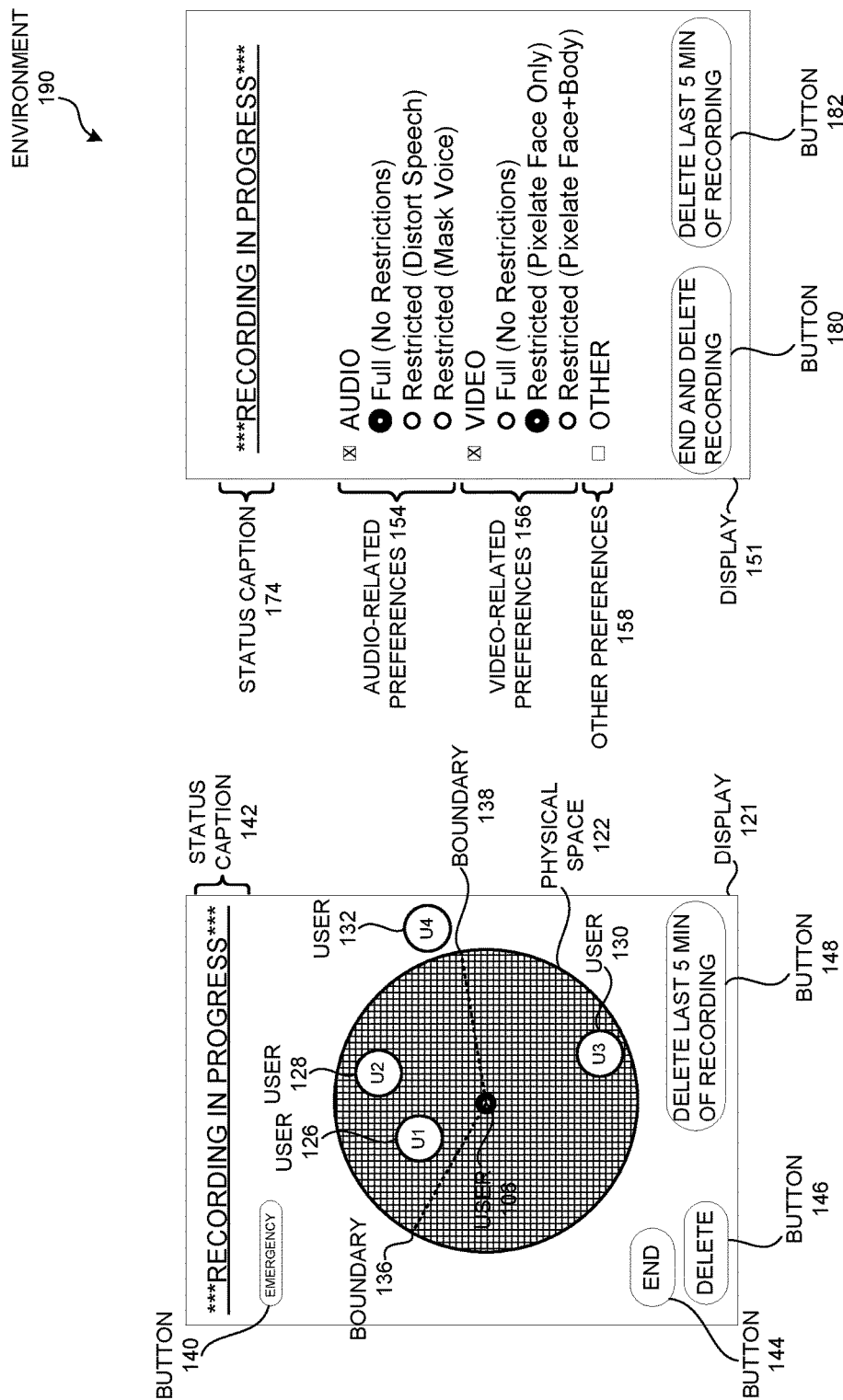
FIG. 1B illustrates an exemplary environment which facilitates access control, in accordance with an embodiment of the present invention.

FIG. 1B illustrates an exemplary environment 190 which facilitates access control, in accordance with an embodiment of the present invention. Environment 190 corresponds to environment 100 of FIG. 1A, and includes only display 121 (as associated with device 108) and display 151 (as associated with device 148) for the sake of illustration. Displays 121 and 151 of FIG. 1B reflect the system at a time subsequent to the actions described in FIG. 1A.

Display 121 can include a status caption 142, such as text that is bolded or in a more noticeable color ("*RECORDING IN PROGRESS*"). Device 108 can also include a flashing red light or other visual or audio indicator that is visible or audible to other users. The flashing red light or other visual indicator can indicate to the other users (both in-range users and non in-range users) that a recording has begun, or is in progress, and that device 108 is the device doing the recording. Display 121 can also indicate physical space 122 of the ongoing recording in a different color or pattern, as shown in FIG. 1A as compared to FIG. 1B.

Display 121 can also indicate a boundary 136 and a boundary 138, which mark the field of view or recording of device 108 of user 106. In-range users within boundaries 136 and 138 in a clockwise direction (i.e., physical space 122 which includes U1 and U2) may receive a full recording request (i.e., full audio, video, metadata), while in-range users within boundaries 138 and 136 in a counterclockwise direction (i.e., physical space 122 which includes U3) may instead receive a partial recording request (i.e., audio only, no video or metadata). The system may determine boundaries 136 and 138 based on, e.g., time, space, occlusion by walls or other physical objects (detected by, e.g., infrared sensor), distance from a recordee or recordees (detectable by, e.g., infrared distance measurement), type of location or setting, angles of view, and power and strength of audio and video capabilities on the user's device.

Display 121 can further include an "End" button 144, which, when clicked, terminates the recording, as well as a "Delete" button 146, which, when clicked, deletes the recording (or causes the recording to be deleted) from any device on which the recording is stored. Display 121 can also include a "Delete Last 5 Min of Recording" button 148, which, when clicked, deletes the last five minutes of the recording (or causes the last five minutes of the recording to be deleted). Button 148 may also include a control to allow the user to indicate a number of minutes to be deleted, within a predetermined range.

Display 151 can include a status caption 174, such as text that is bold or in a more noticeable color ("*RECORDING IN PROGRESS*"). Device 148 can also include a visual or audio indicator (visible or audible to other users) that a recording has commenced or is in progress, and that device 148 is a device (with an associated user) which is being recorded. Display 151 can also include an "End and Delete Recording" button 180, which may be displayed for a predetermined "grace period" of time (e.g., two minutes), and which, when clicked, terminates the recording, and deletes the recording (or causes the recording to be deleted) from any device on which the recording is stored. Button 180 may be greyed out, or not included, after the grace period has passed.

Display 151 can further include a "Delete Last 5 Min of Recording" button 182, which, when clicked, deletes the last five minutes of the recording (or causes the last five minutes of the recording to be deleted). Button 182 may be greyed out for the first five minutes of the recording, or any other predetermined period of time. Similar to button 148, button 182 may also include a control to allow the user to indicate a number of minutes to be deleted, within a predetermined range. Note that any widget or control (such as buttons 134, 140, 160, and 162 of FIG. 1A, and buttons 144, 146, 148, 180, and 182 of FIG. 1B) may be activated via any combination of widgets or via voice control, as in an optical head-mounted or wearable voice-controlled display device such as Google Glass, or via gesture that can be detected by e.g., an accelerometer-enabled or video-enabled computing device.

A User Profile

Figure 2:
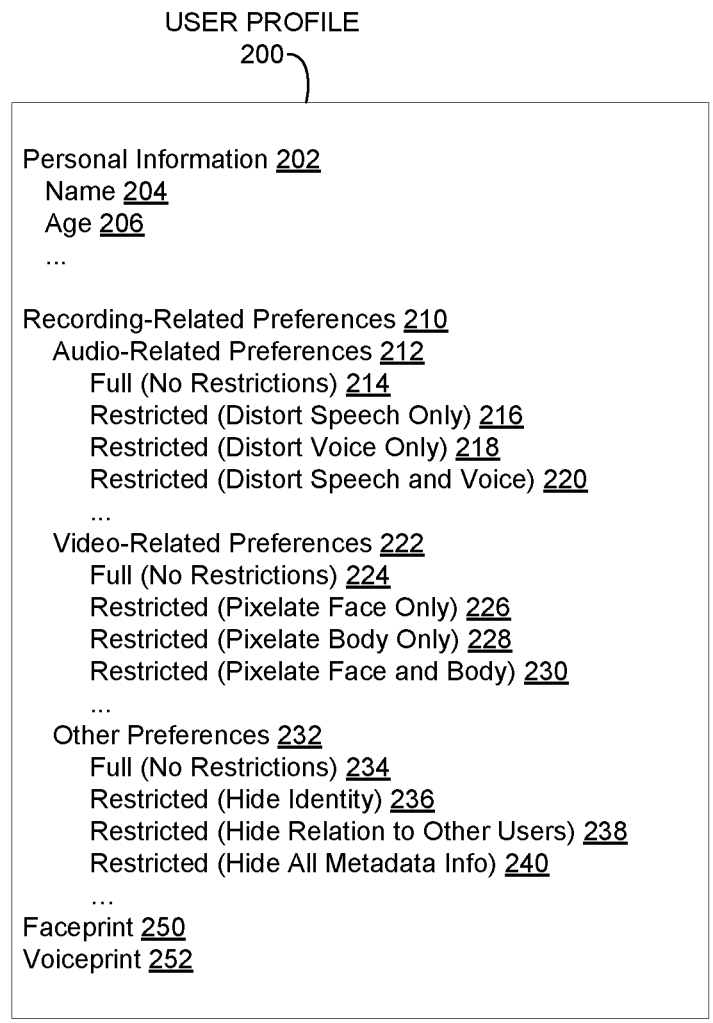
FIG. 2 presents an exemplary user profile for facilitating access control, in accordance with an embodiment of the present invention.

FIG. 2 presents an exemplary user profile 200 for facilitating access control, in accordance with an embodiment of the present invention. User profile 200 can include personal information 202 (such as a name 204 and an age 206), as well as recording-related preferences 210, which can include: audio-related preferences 212; video-related preferences 222; and other preferences 232.

Each type of recording-related preference can include further subcategories. For example, audio-related preferences 210 can include a "Full (No Restrictions)" 214, a "Restricted (Distort Speech Only)" 216, a "Restricted (Distort Voice Only)" 218, and a "Restricted (Distort Speech and Voice)" 220. Video-related preferences 222 can include a "Full (No Restrictions)" 224, a "Restricted (Pixelate Face Only)" 226, a "Restricted (Pixelate Body Only)" 228, and a "Restricted (Pixelate Face and Body)" 230. Other preferences 232 can include a "Full (No Restrictions)" 234, a "Restricted (Hide Identity)" 236, a "Restricted (Hide Relation to Other Users)" 238, and a "Restricted (Hide All Metadata Info)" 230. User profile 200 can also include a faceprint 250 and a voiceprint 252, which may indicate links to a separate video image of the user's face or a separate audio file of the user's voice.

A user can create a user profile, and enter in the user's recording-related preferences. In some embodiments, recording-related preferences 210 can include and/or be based on additional user-configured information, such as time, space, location, and physical distance from the recorder.

The system can use the recording-related preferences (e.g., of an in-range user) to configure the settings on a recorder's requested recording, to which no rejections are received (i.e., that has reached the timeout or received an acceptance from all in-range users).

A user can enter this information either during creation of the user's profile, or at any time, e.g., prior to accepting the recording request. In some embodiments, the user may dynamically change the recording-related preferences after a recording has begun, i.e., after transmitting an acceptance of the request and while the recording is in progress.

Method for Facilitating Access Control by a Recording Device

Figure 3A:
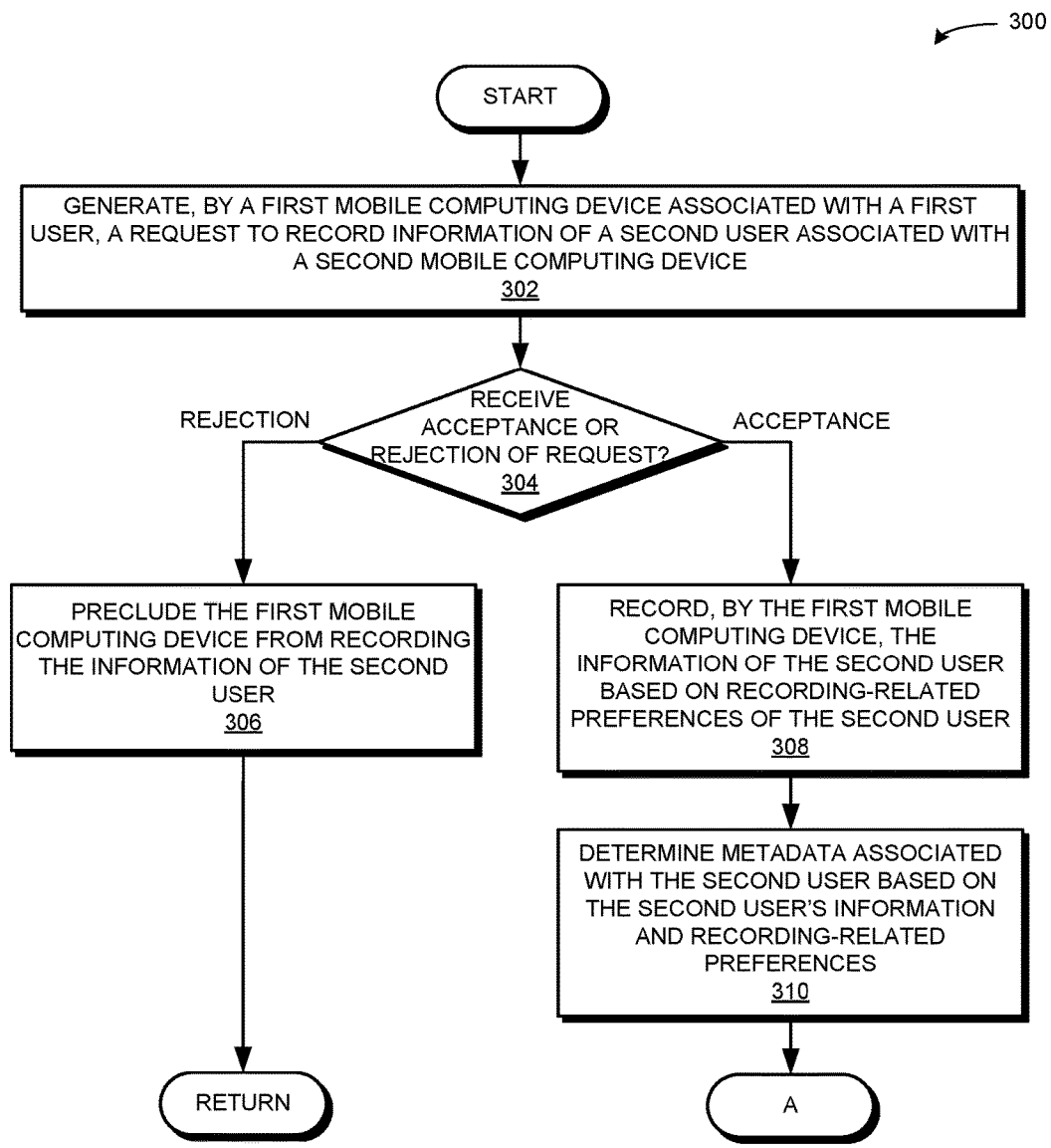
FIG. 3A presents a flow chart illustrating a method by a recording device for facilitating access control, in accordance with an embodiment of the present invention.

FIG. 3A presents a flow chart 300 illustrating a method by a recording device for facilitating access control, in accordance with an embodiment of the present invention. During operation, the system generates, by a first mobile computing device associated with a first user, a request to record information of a second user associated with a second mobile computing device (operation 302). The system determines whether it receives an acceptance or a rejection of the request (decision 304). If the system receives a rejection, the system precludes the first mobile computing device from recording the information of the second user (operation 306), and the operation returns.

If the system receives an acceptance, the system records, by the first mobile computing device, the information of the second user based on recording-related preferences of the second user (operation 308). The system further determines metadata associated with the second user based on the second user's information and recording-related preferences (operation 310). The system can also record the determined metadata. The operation continues as described at Label A of FIG. 3B.

Figure 3B:
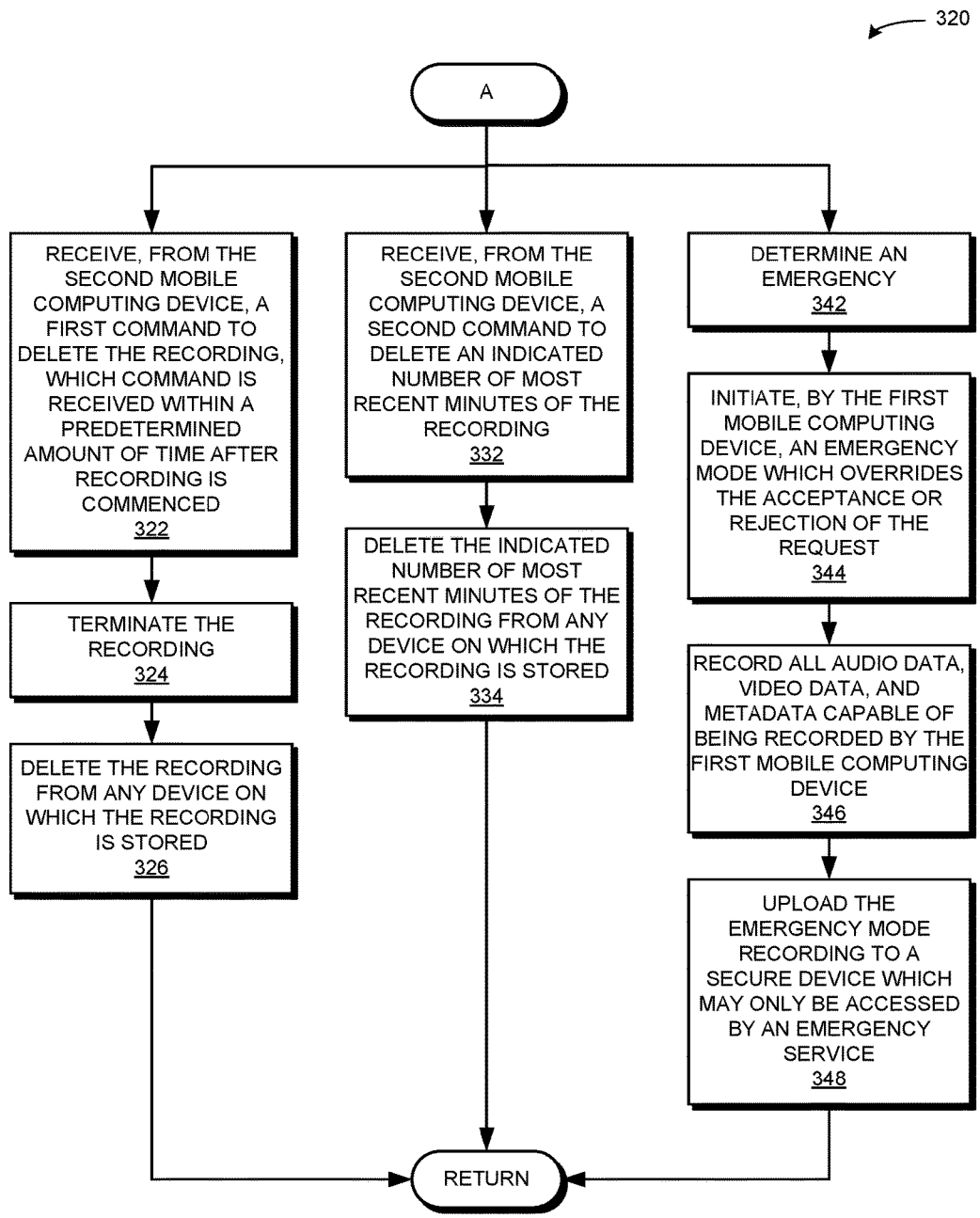
FIG. 3B presents a flow chart illustrating a method by a recording device for facilitating access control, including processing deletion and emergency commands, in accordance with an embodiment of the present invention.

FIG. 3B presents a flow chart 320 illustrating a method by a recording device for facilitating access control, including processing deletion and emergency commands, in accordance with an embodiment of the present invention. During operation, at Label A, the system receives, from the second mobile computing device, a first command to delete the recording, which command is received within a predetermined amount of time after recording is commenced (operation 322). The system terminates the recording (operation 324) and deletes the recording from any device on which the recording is stored (operation 326). At Label A, the system can also receive, from the second mobile computing device, a second command to delete an indicated number of most recent minutes of the recording (operation 332). The system deletes the indicated number of most recent minutes of the recording from any device on which the recording is stored (operation 334).

Further at Label A, the system determines an emergency (operation 342). The first user or the first mobile computing device can detect or determine the emergency. The system initiates, by the first mobile computing device, an emergency mode which overrides the acceptance or rejection of the request (operation 344). The system (immediately) records all audio data, video data, and metadata capable of being recorded by the first mobile computing device (operation 346). The system uploads the emergency mode recording to a secure device which may only be accessed by an emergency service (operation 348).

Figure 3C:
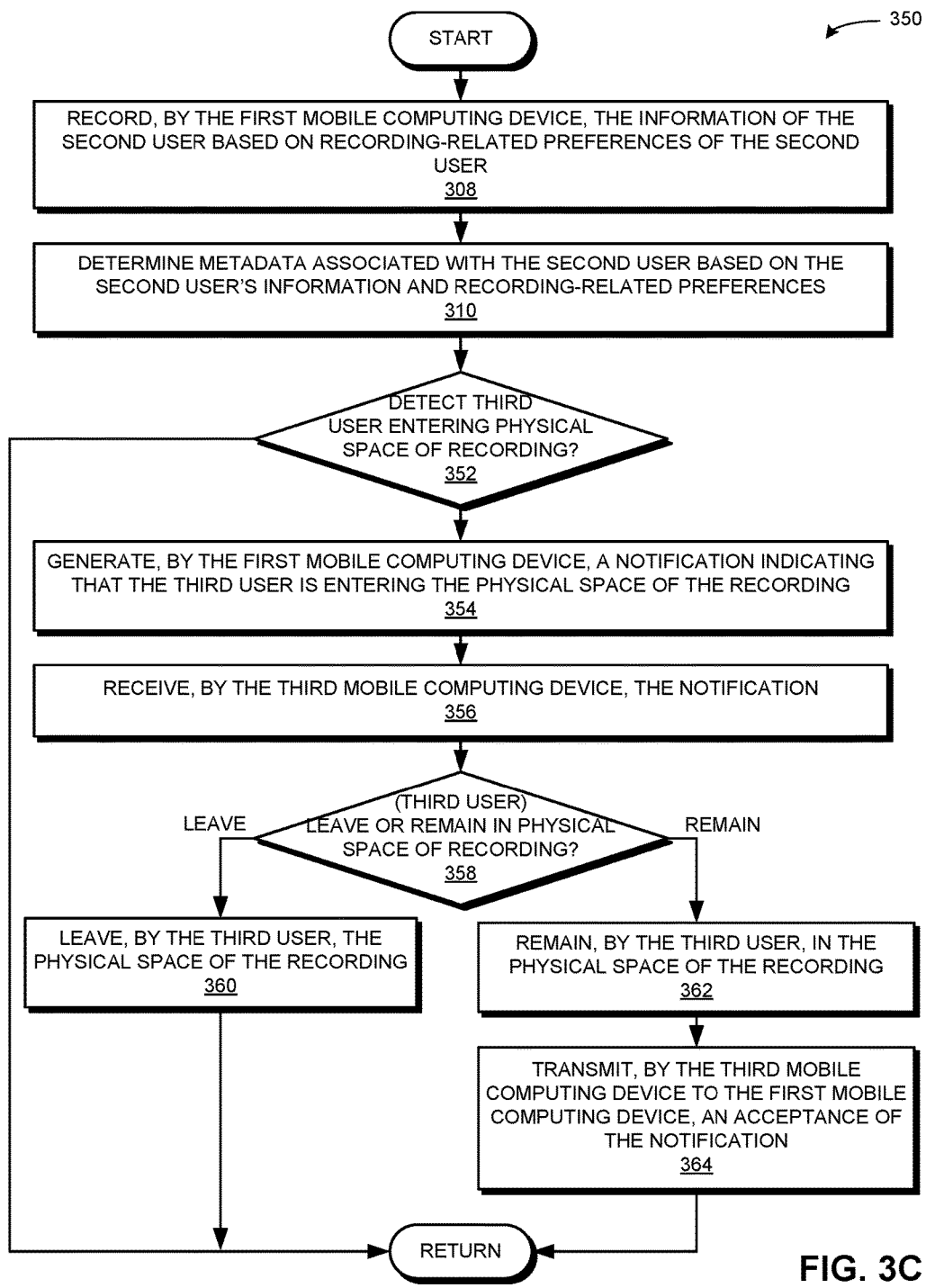
FIG. 3C presents a flow chart illustrating a method by a recording device for facilitating access control, including detecting a user entering a physical space of an ongoing recording, in accordance with an embodiment of the present invention.

FIG. 3C presents a flow chart 350 illustrating a method by a recording device for facilitating access control, including detecting a user entering a physical space of an ongoing recording, in accordance with an embodiment of the present invention. During operation, the system records, by the first mobile computing device, the information of the second user based on recording-related preferences of the second user (operation 308). The system further determines metadata associated with the second user based on the second user's information and recording-related preferences (operation 310).

The system determines whether it detects a third user entering a physical space of the recording. The third user is associated with a third mobile computing device, and the physical space of the recording includes the first mobile computing device and the second user. If the system does not detect a third user entering the physical space of the recording (decision 352), the operation returns. If the system does detect a third user entering the physical space of the recording (decision 352), the system generates, by the first mobile computing device, a notification indicating that the third user is entering the physical space of the recording (operation 354).

The system receives, by the third mobile computing device, the notification (operation 356). The third user determines whether to leave or remain in the physical space of the recording (decision 358). If the third user determines to leave, the third user leaves the physical space of the recording (operation 360), and the operation returns. If the third user determines to remain, the third user remains in the physical space of the recording (operation 362). The system transmits, by the third mobile computing device to the first mobile computing device, an acceptance of the notification (operation 364). The acceptance can indicate the recording-related preferences of the third user, and also allows the first mobile computing device to record the third user based on the recording-related preferences of the third user. The system may be configured to allow the third user no permission, partial permission, or full permission to terminate, halt, or delete the ongoing recording. For example, in some embodiments (full permission), the third user, as an entering user into an ongoing recording, cannot block the ongoing recording or cause the ongoing recording to be terminated, halted, or deleted in any way. In other embodiments (partial permission), the third user cannot terminate or halt the ongoing recording, but can cause the ongoing recording to be deleted only after the third user has been in the recording for a predetermined minimum number of minutes, or based on any other system or user-configured condition.

Figure 3D:
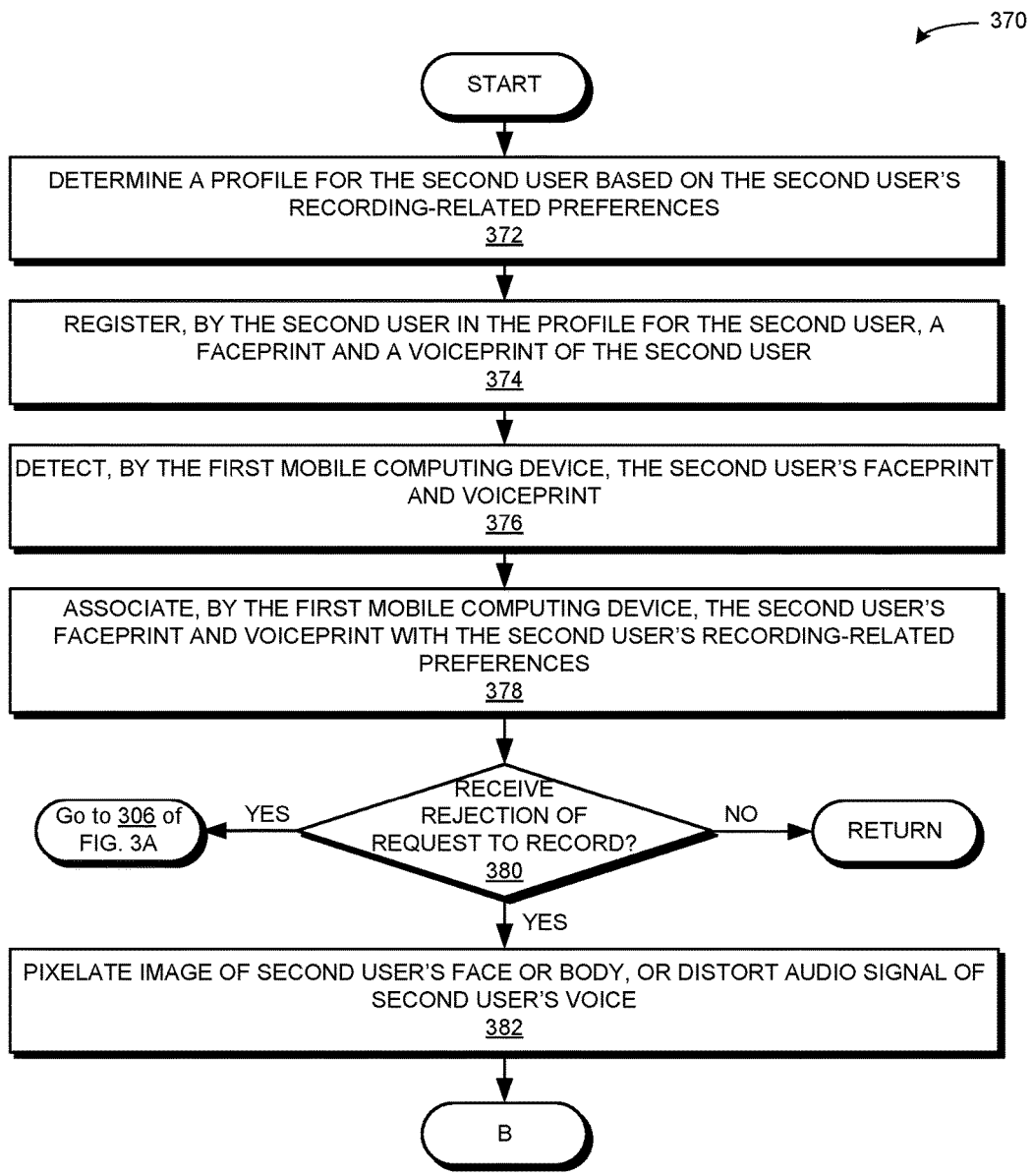
FIG. 3D presents a flow chart illustrating a method for associating a user's faceprint and voiceprint with a profile and recording-related preferences, in accordance with an embodiment of the present invention.

Method for Associating a User's Faceprint and Voiceprint with a Profile and Recording-Related Preferences FIG. 3D presents a flow chart 370 illustrating a method for associating a user's faceprint and voiceprint with a profile and recording-related preferences, in accordance with an embodiment of the present invention. Assume that operation 302 may occur before the operations described flow chart 370. That is, the system generates, by a first mobile computing device associated with a first user, a request to record information of a second user associated with a second mobile computing device. During operation, the system determines a profile for the second user based on the second user's recording-related preferences (operation 372). For example, the second user can create a user account or profile, and set his recording-related preferences. The second user can register, in the second user's profile, a faceprint and a voiceprint of the second user (operation 374). The system can obtain and record the faceprint and voiceprint based on various manners, e.g., video or audio recording devices, location tracking, GPS, WiFi, Bluetooth, infra-red sensor, and any device which can make inferences regarding a detected face or voice.

The first mobile computing device detects the second user's faceprint and voiceprint (operation 376) e.g., based on a manner as described above. The first mobile computing device associates the second user's faceprint and voiceprint with the second user's recording-related preferences (operation 378). For example, the first mobile computing device can obtain the profile (and recording-related preferences) of the second user based on the detected faceprint and voiceprint, which correspond to the faceprint and voiceprint registered in the second user's profile. Subsequently, if the system receives a rejection of a request to record (decision 380), the operation continues either as described at operation 306 of FIG. 3A, or as described at Label B of FIG. 3E. If there system does not receive a rejection of a request to record (decision 380), the operation returns. In some embodiments, decision 380 may be the same as decision 304 of FIG. 3A, that is, the system determines whether it receives an acceptance or a rejection, in which case if the system receives an acceptance, the operation proceeds as described at operation 308 of FIG. 3A.

Figure 3E:
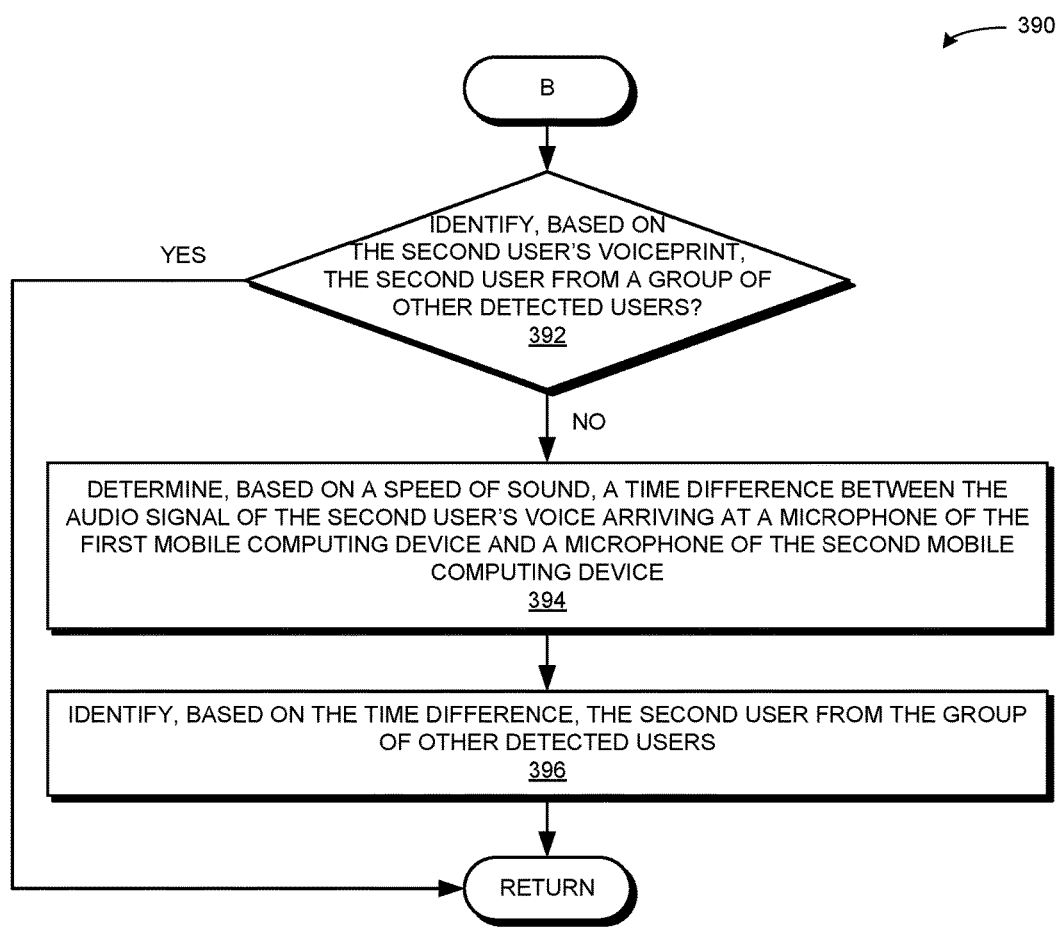
FIG. 3E presents a flow chart illustrating a method for associating a user's faceprint and voiceprint with a profile and recording-related preferences, in accordance with an embodiment of the present invention.

FIG. 3E presents a flow chart 390 illustrating a method for associating a user's faceprint and voiceprint with a profile and recording-related preferences, in accordance with an embodiment of the present invention. During operation, at Label B, the system determines whether it identifies, based on the second user's voiceprint, the second user from a group of other detected users (decision 392). If the system identifies the second user, the operation returns. If the system does not identify, based on the second user's voiceprint, the second user from the group of other detected users, the system determines, based on a speed of sound, a time difference between the audio signal of the second user's voice arriving at a microphone of the first mobile computing device and a microphone of the second mobile computing device (operation 394). The system identifies, based on the time difference, the second user from the group of other detected users (operation 396). The system can also use other methods to determine a position, location, or associated device for a sound wave (e.g., a voice). The system can also use sound wave differentials to distort an audio signal or pixelate a user's face or body, based on the configured system settings.

Method for Facilitating Access Control by a Recordee Device

Figure 4A:
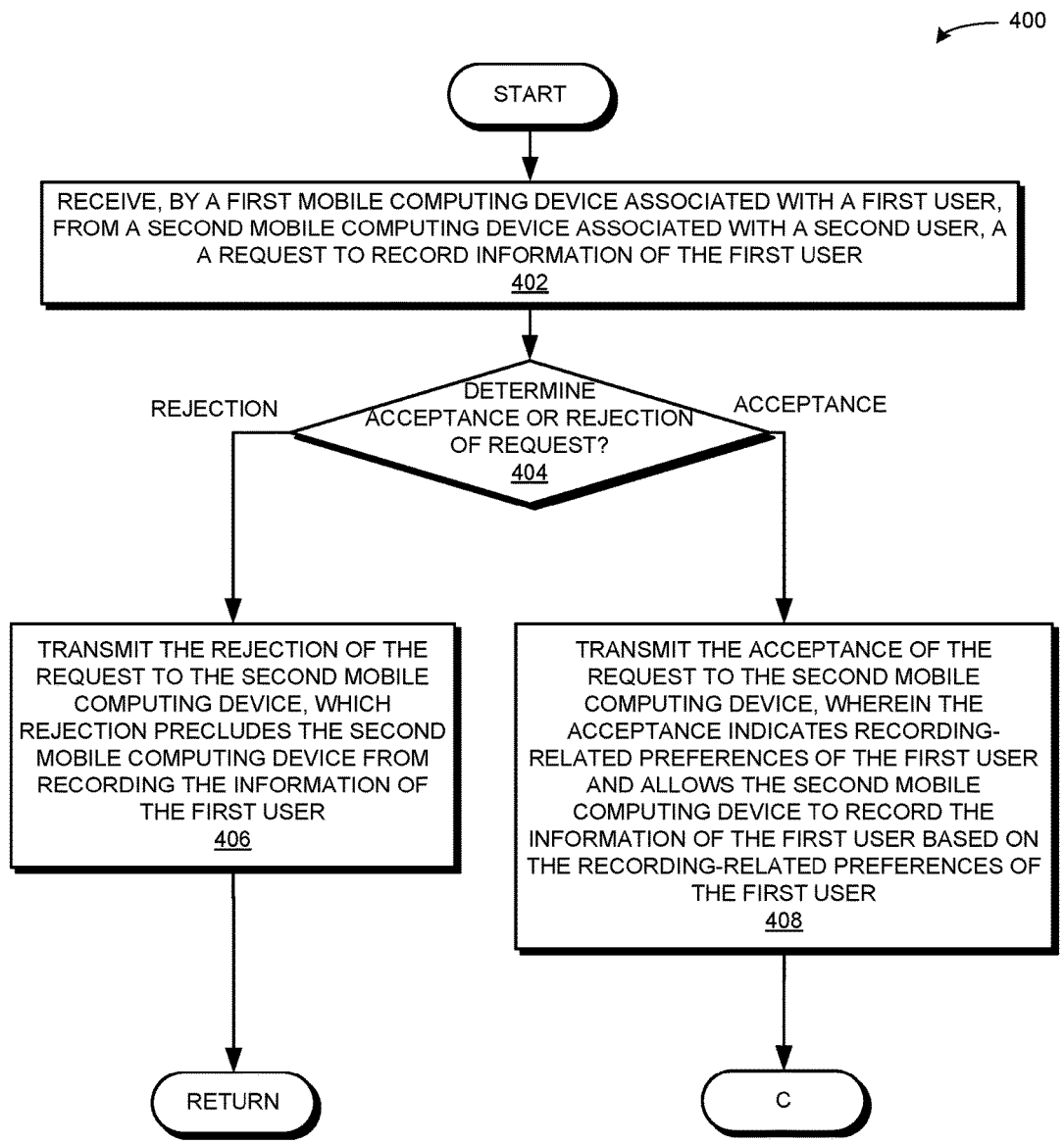
FIG. 4A presents a flow chart illustrating a method by a device associated with a user who may be recorded, in accordance with an embodiment of the present invention.

FIG. 4A presents a flow chart 400 illustrating a method by a device associated with a user who may be recorded, in accordance with an embodiment of the present invention. During operation, the system receives, by a first mobile computing device associated with a first user, from a second mobile computing device associated with a second user, a request to record information of the first user (operation 402). The first user determines an acceptance or a rejection of the request (decision 404). If the first user determines a rejection, the first mobile computing device transmits the rejection of request to the second mobile computing device, which rejection precludes the second mobile computing device from recording the information of the first user (operation 406), and the operation returns.

If the first user determines an acceptance, the first mobile computing device transmits the acceptance of the request to the second mobile computing device, wherein the acceptance indicates recording-related preferences of the first user and allows the second mobile computing device to record the information of the first user based on the recording-related preferences of the first user (operation 408). The operation continues as described at Label C of FIG. 4B.

Figure 4B:
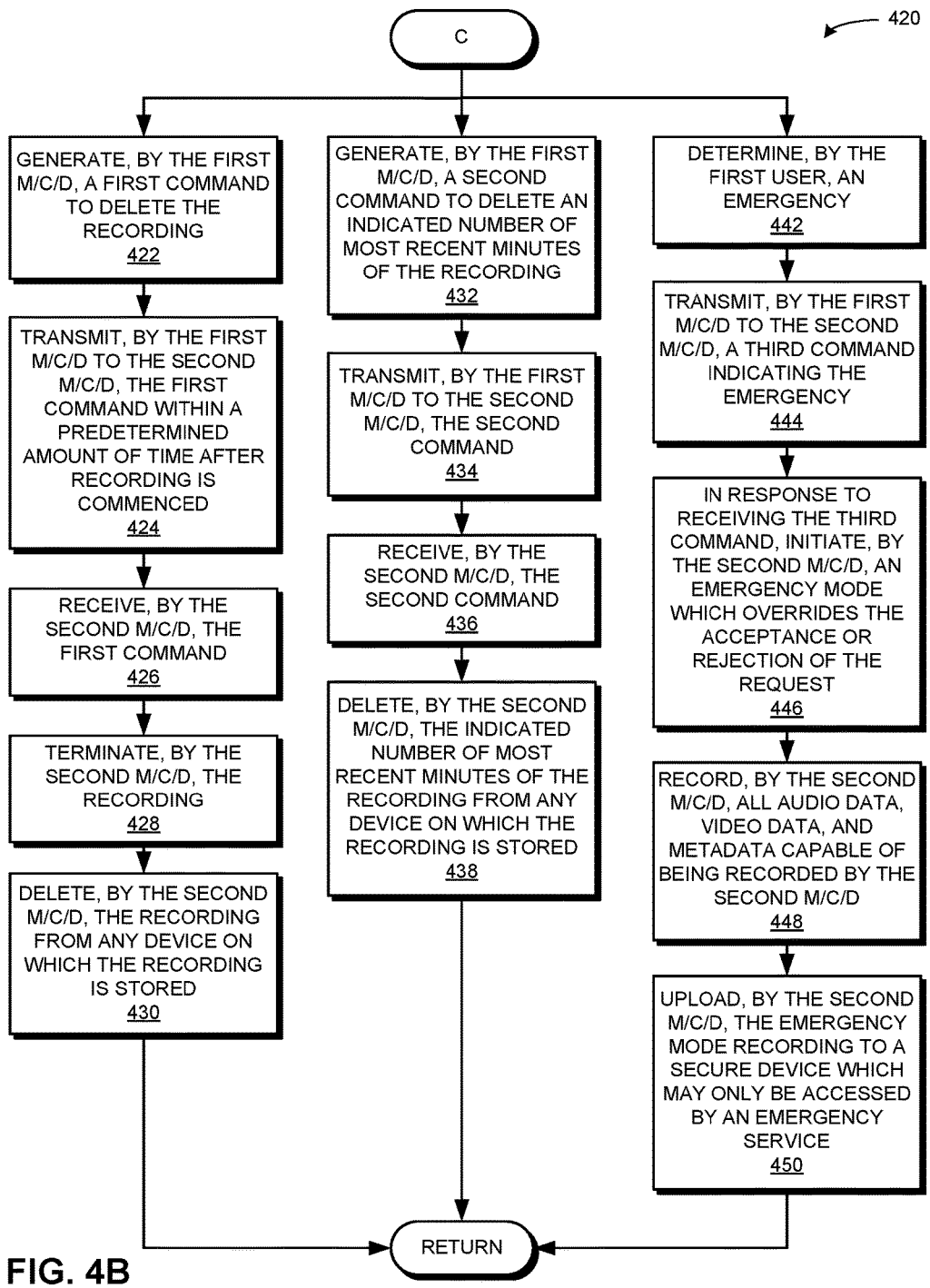
FIG. 4B presents a flow chart illustrating a method by a device associated with a user who may be recorded, including generating deletion and emergency commands, in accordance with an embodiment of the present invention.

FIG. 4B presents a flow chart 420 illustrating a method by a device associated with a user who may be recorded, including generating deletion and emergency commands, in accordance with an embodiment of the present invention. During operation, at Label C, the system generates, by the first mobile computing device ("m/c/d"), a first command to delete the recording (operation 422). The system transmits, by the first mobile computing device to the second mobile computing device, the first command within a predetermined amount of time after recording is commenced (operation 424). The system receives, by the second mobile computing device, the first command (operation 426), and terminates, by the second mobile computing device, the recording (operation 428). The system deletes, by the second mobile computing device, the recording (or causes the recording to be deleted) from any device on which the recording is stored (operation 430).

At Label C, the system can also generate, by the first mobile computing device, a second command to delete an indicated number of most recent minutes of the recording (operation 432). The system transmits, by the first mobile computing device to the second mobile computing device, the second command (operation 434). The system receives, by the second mobile computing device, the second command (operation 436). The system deletes, by the second computing device, the indicated number of most recent number of minutes of the recording from any device on which the recording is stored (operation 438).

Further at Label C, the system determines, by the first user, an emergency (operation 442). The emergency can be determined or detected by the first user or the first mobile computing device. The system transmits, by the first mobile computing device to the second mobile computing device, a third command indicating the emergency (operation 444). In response to receiving the third command, the system initiates, by the second mobile computing device, an emergency mode which overrides the acceptance or rejection of the request (operation 446). The system (immediately) records, by the second mobile computing device, all audio data, video data, and metadata capable of being recorded by the second mobile computing device (operation 448). The system uploads, by the second mobile computing device, the emergency mode recording to a secure device which may only be accessed by an emergency service (operation 450).

Exemplary Device and Computer System

Figure 5:
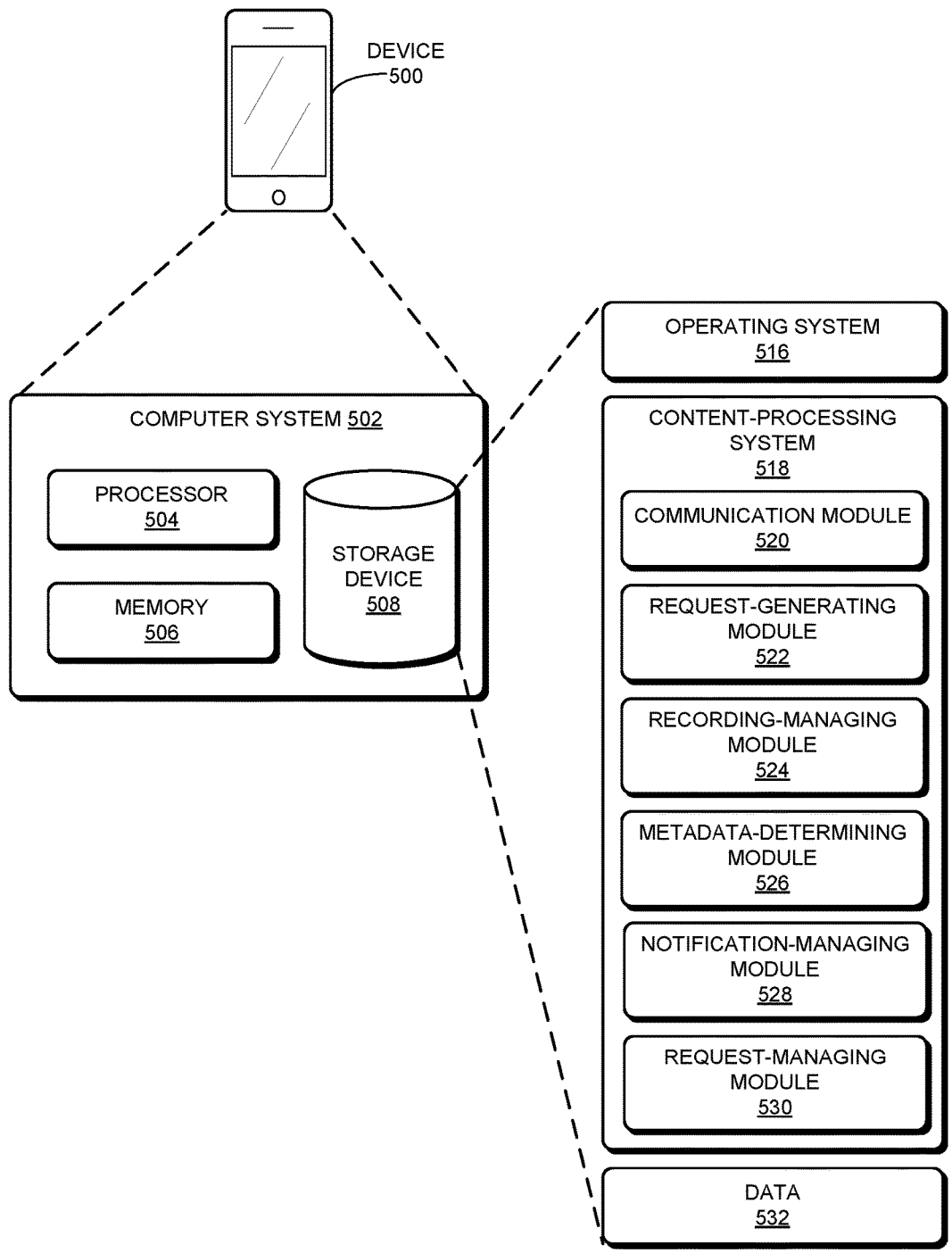
FIG. 5 illustrates an exemplary computer system that facilitates access control, in accordance with an embodiment of the present invention.

FIG. 5 illustrates an exemplary computer system 502 that facilitates access control, in accordance with an embodiment of the present invention. A device 500 can include computer system 502, which includes a processor 504, a memory 506, and a storage device 508. Memory 506 can include a volatile memory (e.g., RAM) that serves as a managed memory, and can be used to store one or more memory pools. Device 500 can be a personal smartphone, a mobile phone, a tablet, a three-dimensional viewing glass, or any other mobile computing device. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network or within a network node itself (communication module 520). Content-processing system 518 can include instructions for generating, by a first mobile computing device associated with a first user, a request to record information of a second user associated with a second mobile computing device (request-generating module 522). Content-processing system 518 can include instructions for, in response to receiving, from the second mobile computing device, an acceptance of the request (communication module 520), recording, by the first mobile computing device, the information of the second user based on recording-related preferences of the second user (recording-managing module 524). Content-processing system 518 can include instructions for, in response to receiving, from the second mobile computing device, a rejection of the request (communication module 520), precluding the first mobile computing device from recording the information of the second user (recording-managing module 524).

Content-processing system 518 can include instructions for determining metadata associated with the second user (metadata-determining module 526). Content-processing system 518 can include instructions for, in response to receiving a command associated with the recording (communication module 520), performing or executing the command on the recording (recording-managing module 524). Content-processing system 518 can include instructions for, in response to detecting a third user entering a physical space of the recording (notification-managing module), generating a notification indicating that the third user is entering the physical space of the recording (notification-managing module 528).

Content-processing system 518 can include instructions for, in response to determining an emergency (request-managing module 530), initiating an emergency mode, recording all available data, and uploading the recording to a secure device (request-managing module 530). Content-processing system 518 can include instructions for determining a user profile, registering a user's faceprint and voiceprint in a user profile, detecting and associating a user's faceprint and voiceprint with the user's recording-related preferences, providing a user with access to a central service, broadcasting a user's recording-related preferences to other users, detecting and managing a violation by a user of another user's recording-related preferences, providing a subscription to a data source for a user, defining a recording-free or a partial recording-free zone (recording-managing module 524).

Content-processing system 518 can include instructions for receiving, by a first mobile computing device associated with a first user, from a second mobile computing device associated with a second user, a request to record information of the first user (communication module 520). Content-processing system 518 can include instructions for, in response to determining an acceptance of the request (request-managing module 530), transmitting the acceptance of the request to the second mobile computing device (communication module 520). Content-processing system 518 can include instructions for, in response to determining a rejection of the request (request-managing module 530), transmitting the rejection of the request to the second mobile computing device (communication module 520).

Content-processing system 518 can include instructions for generating, by the first mobile computing device, a command associated with the recording (request-generating module 522), and transmitting the command to the second mobile computing device (communication module 520). Content-processing system 518 can include instructions for determining an emergency (request-managing module 530) and transmitting a command indicating the emergency (request-generating module 522 and communication module 520).

Data 532 can include any data that is required as input or that is generated as output by the methods and/or processes described in this disclosure. Specifically, data 532 can store at least: a request; a request to record information of a user associated with a mobile computing device; an acceptance or a rejection of the request; a recording; an emergency mode recording; recording-related preferences of a user; information of a user; an indication of a physical space of a recording or which includes a user; an association or relation between users; a command; a command to delete all or part of a recording; an indicated number of most recent minutes of a recording to be deleted; a notification; a notification of a user entering into a physical space of a recording; an acceptance of a notification; audio data; video data; an image; metadata; audio-related preferences; video-related preferences; metadata-related preferences; an indicator of an emergency mode; a user profile; access to a central service; a violation of a user's recording-related preferences; a subscription to a data source; a threshold for a method of recording; an indicator of a recording-free zone or a partial recording free zone; and a predetermined set of rules associated with a user.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating access control, the method comprising:
    generating, by a first mobile computing device associated with a first user, a request to make a video or an audio recording of a second user associated with a second mobile computing device;
    sending the request to the second mobile computing device, wherein the request is received by the second mobile computing device;
    displaying, by the second mobile computing device, an alert caption, recording-related preferences of the second user, a first widget to accept the request, and a second widget to reject the request,
    wherein the displayed recording-related preferences are selectable and include audio options and video options;
    in response to receiving, by the first mobile computing device from the second mobile computing device, an acceptance of the request based on the second user clicking on the first widget to accept the request to make the video or audio recording of the second user, initiating, by the first mobile computing device, the video or audio recording of the second user based on the audio options and video options of the second user included in the received acceptance; and
    in response to receiving, from the second mobile computing device, a rejection of the request based on the second user clicking on the second widget to reject the request, precluding the first mobile computing device from initiating the video or audio recording of the second user,
    thereby facilitating intuitive and socially aligned access control.

2. The method of claim 1, wherein in response to recording the second user, the method further comprises:
    determining metadata associated with the second user based on one or more of:
        information of the second user;
        the recording-related preferences of the second user;
        information of one or more users in a same physical space as the second user; and
        recording-related preferences of one or more users associated with the second user.

3. The method of claim 1, wherein subsequent to initiating the video or audio recording of the second user, the method further comprises:
    in response to receiving, from the second mobile computing device, a first command to delete the recording, wherein the first command is received within a predetermined amount of time after initiating the video or audio recording:
        terminating the recording; and
        deleting the recording from any device on which the recording is stored; and
    in response to receiving, from the second mobile computing device, a second command to delete an indicated number of most recent minutes of the recording:
        deleting the indicated number of most recent minutes of the recording.

4. The method of claim 1, wherein in response to initiating the video or audio recording the second user, the method further comprises:
    in response to detecting a third user entering a physical space of the recording, wherein the third user is associated with a third mobile computing device, and wherein the physical space includes the first mobile computing device and the second user:
    generating, by the first mobile computing device, a notification indicating that the third user is entering the physical space of the recording, which allows the third user to:
        leave the physical space; or
        remain in the physical space, which allows the third mobile computing device to transmit, to the first mobile computing device, an acceptance of the notification,
        wherein the acceptance indicates recording-related preferences of the third user and allows the first mobile computing device to make a video or an audio recording of the third user based on the recording-related preferences of the third user.

5. The method of claim 1, wherein initiating the video or audio recording of the second user includes recording one or more of:
    audio data;
    video data;
    an image; and
    metadata, including one or more of a name, an age, a current location, an occupation, a social media profile, a relationship to the first user and to one or more other detected users, recording-related preferences, and any information associated with the second user which can be captured and recorded by a mobile computing device; and
    wherein the recording-related preferences of the second user include one or more of:
        audio-related preferences, including distorting the second user's speech and masking the second user's voice;
        video-related preferences, including pixelating an image of the second user's face or body; and metadata-related preferences, including whether to record the second user's identity, information about the second user, and the second user's relation to one or more other detected users.

6. The method of claim 1, wherein receiving the rejection of the request further comprises one or more of:
pixelating an image of the second user's face or body; and distorting an audio signal of the second user's voice; and
wherein the method further comprises:
in response to unsuccessfully identifying, based on a voiceprint of the second user, the second user from a group of other detected users:
determining, based on a speed of sound, a time difference between the audio signal of the second user's voice arriving at a microphone of the first mobile computing device and a microphone of the second mobile computing device; and
identifying, based on the time difference, the second user from the group of other detected users.

7. The method of claim 1, wherein in response to determining an emergency, the method further comprises:
initiating, by the first mobile computing device, an emergency mode which overrides the acceptance or the rejection of the request;
recording any audio data, video data, images, and metadata capable of being recorded by the first mobile computing device; and
uploading the recording to a secure device which may only be accessed by an emergency service.

8. The method of claim 1, further comprising:
determining a profile for the first user based on the first user's recording-related preferences; and
associating, with the profile for the first user, information including a faceprint, a voiceprint, and metadata of the second user and one or more other users,
wherein initiating the video or audio recording the second user and the other users is further based on the associated information of the second user and the one or more other users.

9. The method of claim 1, further comprising:
determining a profile for the second user based on the second user's recording-related preferences, wherein the profile for the second user includes a registered faceprint and a registered voiceprint of the second user;
detecting, by the first mobile computing device, the second user's faceprint and voiceprint; and
associating the second user's faceprint and voiceprint with the second user's recording-related preferences.

10. The method of claim 1, further comprising one or more of:
providing the second user access to a central service with which to register the second user's profile and recording-related preferences;
broadcasting the second user's recording-related preferences to other users of the central service, wherein the other users are within a predetermined distance of or in a same physical space as the second user;
in response to detecting a violation of the second user's recording-related preferences, sending a notification to the second user indicating the detected violation of the second user's recording-related preferences;
in response to detecting a violation by the first user of the recording-related preferences of the second user or recording-related preferences of any user, sending a notification to the first user indicating the detected violation by the first user;
providing a subscription to a data source for the second user;
initiating the video or audio recording of the second user based on a predetermined limit for a type of recording and a GPS-based inference of a distance from the first user's physical location to the second user's physical location, wherein the type of recording includes one or more of audio, video, image, and metadata;
defining a recording-free zone which precludes a mobile computing device physically located in or within a predetermined distance from the recording-free zone from initiating a video or audio recording of any user physically located in the recording-free zone or from recording any information of any user physically located in the recording-free zone; and
defining a partial recording-free zone which precludes a mobile computing device physically located in or within a predetermined distance from the partial recording-free zone from initiating a video or audio recording of any user physically located in the partial recording-free zone or from recording some type or types of information of any user physically located in the partial recording-free zone, based on a predetermined set of rules or recording-related preferences of a respective user physically located in the partial recording-free zone.

11. A method for facilitating access control, the method comprising:
receiving, by a first mobile computing device associated with a first user, from a second mobile computing device associated with a second user, a request to make a video or an audio recording of the first user;
displaying, by the first mobile computing device, recording-related preferences of the first user, a first widget to accept the request and a second widget to reject the request,
wherein the displayed recording-related preferences are selectable and include audio options and video options;
in response to the first user clicking on the first widget to accept the request to make the video or audio recording of the first user, determining an acceptance of the request by transmitting, by the first mobile computing device to the second mobile computing device, the acceptance of the request, wherein the acceptance includes the audio options and video options of the first user and allows the second mobile computing device to initiate the video or audio recording of the first user based on the audio options and video options of the first user included in the transmitted acceptance; and
in response to the first user clicking on the second widget to reject the request, determining a rejection of the request by transmitting the rejection of the request to the second mobile computing device, which rejection precludes the second mobile computing device from initiating the video or audio recording of the first user,
thereby facilitating intuitive and socially aligned access control.

12. The method of claim 11, wherein subsequent to transmitting the acceptance of the request and allowing the second mobile computing device to initiate the video or audio recording of the first user, the method further comprises:
generating, by the first mobile computing device, a first command to delete the recording,
wherein the first command is transmitted to the second mobile computing device within a predetermined amount of time after initiating the video or audio recording, which allows the second mobile computing device to:
  terminate the recording; and
  delete the recording from any device on which the recording is stored; or
generating, by the first mobile computing device, a second command to delete an indicated number of most recent minutes of the recording,
wherein the second command is transmitted to the second mobile computing device, which allows the second mobile computing device to:
  delete the indicated number of most recent minutes of the recording.

13. The method of claim 11, wherein initiating the video or audio recording of the first user includes recording one or more of:
  audio data;
  video data; and
  an image; and
  metadata, including one or more of a name, an age, a current location, an occupation, a social media profile, a relationship to the first user and to one or more other detected users, recording-related preferences, and any information associated with the second user which can be captured and recorded by a mobile computing device; and
wherein the recording-related preferences of the first user include one or more of:
  audio-related preferences, including distorting the first user's speech and masking the first user's voice;
  video-related preferences, including pixelating an image of the first user's face or body; and
  metadata-related preferences, including whether to record the first user's identity, information about the first user, and the first user's relation to one or more other detected users.

14. The method of claim 11, further comprising:
determining, by the first user or the first mobile computing device, an emergency; and
transmitting, by the first mobile computing device to the second mobile computing device, a third command indicating the emergency, which allows the second mobile computing device to:
  initiate an emergency mode which overrides the acceptance or the rejection of the request;
  record any audio data, video data, images, and metadata capable of being recorded by the first mobile computing device; and
  upload the recording to a secure device which may only be accessed by an emergency service.

15. The method of claim 11, further comprising:
determining a profile for the first user based on the first user's recording-related preferences;
registering, in the profile for the first user, a faceprint and a voiceprint of the first user, which allows the second mobile computing device to detect and associate the first user's faceprint and voiceprint with the first user's recording-related preferences.

16. The method of claim 11, further comprising one or more of:
  providing the first user access to a central service with which to register the first user's profile and recording-related preferences;
  broadcasting the first user's recording-related preferences to other users of the central service, wherein the other users are within a predetermined distance of or in a same physical space as the first user;
  in response to detecting a violation of the second user's recording-related preferences, sending a notification to the second user indicating the detected violation of the second user's recording-related preferences;
  in response to detecting a violation by the second user of the recording-related preferences of the first user or recording-related preferences of any user, sending a notification to the second user indicating the detected violation by the second user;
  providing a subscription to a data source for the first user;
  initiating the video or audio recording of the first user based on a predetermined limit for a type of recording and a GPS-based inference of a distance from the first user's physical location to the second user's physical location, wherein the type of recording includes one or more of audio, video, image, and metadata;
  defining a recording-free zone which precludes a mobile computing device physically located in or within a predetermined distance from the recording-free zone from initiating a video or audio recording of any user physically located in the recording-free zone or from recording any information of any user physically located in the recording-free zone; and
  defining a partial recording-free zone which precludes a mobile computing device physically located in or within a predetermined distance from the partial recording-free zone from initiating a video or audio recording of any user physically located in the partial recording-free zone or from recording some type or types of information of any user physically located in the partial recording-free zone, based on a predetermined set of rules or recording-related preferences of a respective user physically located in the partial recording-free zone.

17. A computer system for facilitating access control, the computer system comprising:
  a processor; and
  a storage device storing instructions that when executed by the processor cause the processor to perform a method, the method comprising:
    generating, by a first mobile computing device associated with a first user, a request to make a video or an audio recording of a second user associated with a second mobile computing device;
    sending the request to the second mobile computing device, wherein the request is received by the second mobile computing device;
    displaying, by the second mobile computing device, an alert caption, recording-related preferences of the second user, a first widget to accept the request, and a second widget to reject the request,
    wherein the displayed recording-related preferences are selectable and include audio options and video options;
    in response to receiving, by the first mobile computing device from the second mobile computing device, an acceptance of the request based on the second user clicking on the first widget to accept the request to make the video or audio recording of the second user, initiating, by the first mobile computing device, the video or audio recording of the second user based on the audio options and video options of the second user included in the received acceptance; and
    in response to receiving, from the second mobile computing device, a rejection of the request based on the second user clicking on the second widget to reject the request, precluding the first mobile computing device from initiating the video or audio recording of the second user, thereby facilitating intuitive and socially aligned access control.

18. The computer system of claim 17, wherein in response to recording the second user, the method further comprises:
   determining metadata associated with the second user based on one or more of:
      information of the second user;
      the recording-related preferences of the second user;
      information of one or more users in a same physical space as the second user; and
      recording-related preferences of one or more users associated with the second user.

19. The computer system of claim 17, wherein subsequent to initiating the video or audio recording of the second user, the method further comprises:
   in response to receiving, from the second mobile computing device, a first command to delete the recording, wherein the first command is received within a predetermined amount of time after initiating the video or audio recording:
      terminating the recording; and
      deleting the recording from any device on which the recording is stored; and
   in response to receiving, from the second mobile computing device, a second command to delete an indicated number of most recent minutes of the recording:
      deleting the indicated number of most recent minutes of the recording.

20. The computer system of claim 17, wherein the method further comprises one or more of:
   determining a profile for the second user based on the second user's recording-related preferences, wherein the profile for the second user includes a registered faceprint and a registered voiceprint of the second user;
   detecting, by the first mobile computing device, the second user's faceprint and voiceprint;
   associating the second user's faceprint and voiceprint with the second user's recording-related preferences;
   providing the second user access to a central service with which to register the second user's profile and recording-related preferences;
   broadcasting the second user's recording-related preferences to other users of the central service, wherein the other users are within a predetermined distance of or in a same physical space as the second user;
   in response to detecting a violation of the second user's recording-related preferences, sending a notification to the second user indicating the detected violation of the second user's recording-related preferences;
   in response to detecting a violation by the first user of the recording-related preferences of the second user or recording-related preferences of any user, sending a notification to the first user indicating the detected violation by the first user;
   providing a subscription to a data source for the second user;
   initiating the video or audio recording of the second user based on a predetermined limit for a type of recording and a GPS-based inference of a distance from the first user's physical location to the second user's physical location, wherein the type of recording includes one or more of audio, video, image, and metadata;
   defining a recording-free zone which precludes a mobile computing device physically located in or within a predetermined distance from the recording-free zone from initiating a video or audio recording of any user physically located in the recording-free zone or from recording any information of any user physically located in the recording-free zone; and
   defining a partial recording-free zone which precludes a mobile computing device physically located in or within a predetermined distance from the partial recording-free zone from initiating a video or audio recording of any user physically located in the partial recording-free zone or from recording some type or types of information of any user physically located in the partial recording-free zone, based on a predetermined set of rules or recording-related preferences of a respective user physically located in the partial recording-free zone.

* * * * *